US012759892B2

(12) United States Patent
Chen et al.

(10) Patent No.: US 12,759,892 B2
(45) Date of Patent: Oct. 13, 2026

(54) METHOD FOR PREPARING TIN OXIDE NANOPARTICLES DISPERSED IN ALCOHOL SOLVENT, AND USE THEREOF

(71) Applicant: SOOCHOW UNIVERSITY, Suzhou (CN)

(72) Inventors: Song Chen, Suzhou (CN); Yu Chen, Suzhou (CN); Mengyu Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 475 days.

(21) Appl. No.: 18/438,465

(22) Filed: Feb. 10, 2024

(65) Prior Publication Data

US 2024/0246831 A1 Jul. 25, 2024

Related U.S. Application Data

(63) Continuation of application No. PCT/CN2022/142168, filed on Dec. 27, 2022.

(30) Foreign Application Priority Data

Jan. 11, 2022 (CN) ......................... 202210025997.0

(51) Int. Cl.
*C01G 19/02* (2006.01)
*B82Y 20/00* (2011.01)
*B82Y 40/00* (2011.01)

(52) U.S. Cl.
CPC .............. *C01G 19/02* (2013.01); *B82Y 20/00* (2013.01); *B82Y 40/00* (2013.01); *C01P 2004/64* (2013.01)

(58) Field of Classification Search
None
See application file for complete search history.

(56) References Cited

U.S. PATENT DOCUMENTS 6,296,943 B1 * 10/2001 Watanabe ............ C01G 23/003 428/447
8,679,440 B2 * 3/2014 Yang ...................... B82Y 40/00 423/385

(Continued)

FOREIGN PATENT DOCUMENTS

CN 102086044 A 6/2011
CN 103332726 A 10/2013

(Continued)

OTHER PUBLICATIONS

Chun Huang et al., "Ionic Liquid Modified SnO2 Nanocrystals as the Robust Electron Transporting Layer for Efficient Planar Perovskite Solar Cells" Journal of Materials Chemistry A, vol. 6, Jun. 27, 2018, ISSN: 2050-7488.

(Continued)

*Primary Examiner* — John J Figueroa
(74) *Attorney, Agent, or Firm* — SZDC Law PC

(57) ABSTRACT

The present invention relates to the technical field of nanomaterials and provides a method for preparing tin oxide ($SnO_2$) nanoparticles dispersed in an alcohol solvent, and use thereof. The preparation method includes: (1) dissolving tin chloride and a base in an ethanol solution, reacting with heating at a constant temperature, subjecting the reaction product to solid-liquid separation, collecting the solid phase, and dissolving the solid phase in an alcohol solvent, to obtain a tin oxide-alcohol dispersion; and (2) adding a quaternary ammonium base to the tin oxide-alcohol dispersion obtained in Step (1), and reacting with stirring, to obtain the tin oxide nanoparticles. The tin oxide nanoparticles of the present invention provide a new approach to the improvement of the stability of optoelectronic devices, and broaden the scope of $SnO_2$ application, thus having important practical significance.

10 Claims, 6 Drawing Sheets

(56) References Cited

U.S. PATENT DOCUMENTS

| | | | | |
|---|---|---|---|---|
| 2008/0276835 | A1* | 11/2008 | Koyama | C01G 19/02 106/287.3 |
| 2010/0207076 | A1* | 8/2010 | Fujimoto | C09D 7/67 252/520.1 |
| 2010/0239872 | A1* | 9/2010 | Koyama | C09C 1/0081 502/158 |

FOREIGN PATENT DOCUMENTS

| | | | | |
|---|---|---|---|---|
| CN | 108163887 | A | 6/2018 | |
| CN | 114314645 | A | 4/2022 | |
| JP | S6427635 | A | 1/1989 | |
| WO | WO-9813427 | A1 * | 4/1998 | A61K 8/0275 |

OTHER PUBLICATIONS

Pei-Huan Lee et al., "Work Function Tunable Electron Transport Layer of Molecule Capped Metal Oxide for High Efficiency and Stable P-I-N Perovskite Solar Cell" ACS Applied Materials & Interfaces, vol. 12, Sep. 11, 2020, ISSN: 194408244.

* cited by examiner

METHOD FOR PREPARING TIN OXIDE NANOPARTICLES DISPERSED IN ALCOHOL SOLVENT, AND USE THEREOF

This application is a Continuation Application of PCT/CN2022/142168, filed on Dec. 27, 2022, which claims priority to Chinese Patent Application No. 202210025997.0, filed on Jan. 11, 2022, which is incorporated by reference for all purposes as if fully set forth herein.

FIELD OF THE INVENTION

The present invention relates to the technical field of nano-materials, and in particular, to a method for preparing tin oxide nanoparticles dispersed in an alcohol solvent, and use thereof.

DESCRIPTION OF THE RELATED ART

Nanomaterials of oxides with wide band gaps have been an active research field for the past twenty years. For example, tin oxide is a stable n-type semiconductor with a wide band gap, which receives great attention because of its prospects of application in gas sensors, solar cells, lithium-ion batteries, and heterojunction diodes. With different synthesis strategies, tin oxide nanomaterials of different morphologies can be prepared, such as zero-dimensional nanoparticles, one-dimensional nanowires, two-dimensional nanosheets, and three-dimensional nanospheres. When the size of tin oxide nanoparticles is reduced to its Bohr radius, their unique physical and chemical properties will become prominent due to the quantum confinement effect. However, due to the surface effect after the size reduction, the surface energy is increased, and the nanoparticles are in an unstable state of energy, so the nanoparticles tend to agglomerate. Therefore, finding a stable dispersion system for tin oxide nanoparticles is a prerequisite for its application.

At present, the vast majority of commercially available tin oxide nanoparticles are in the form of dispersion in water to which potassium hydroxide (KOH) is added as a stabilizer. The tin oxide nanoparticles are dispersed with the aid of electrostatic repulsion brought by the hydroxide ions ($OH^-$) produced by KOH ionization and adsorbed on the surface of tin oxide nanoparticles. However, this strategy is only effective for solvents with a high degree of ionization but is not suitable for non-ionized solvents (such as alcohols and organic solvents with lower polarity). The dependence on aqueous solvents greatly limits the application scenarios of tin oxide. Considering the defects of aqueous solvents, for p-i-n heterojunction thin film semiconductor devices (inverted solar cells, normal-structured light-emitting diodes, and etc.), the aqueous solution encounters processing issues such as excessively larger contact angles, non-wettability, and uneven film formation when it is prepared on a substrate of low surface energy. Moreover, the optoelectronic performances of both bulk perovskite and inorganic quantum dots can deteriorate in the presence of residual water. Considering the process requirements, the desirable solvent for oxide semiconductor nanoparticles is an alcohol solvent. Because the substrate material is usually soluble in low polarity solvents, the alcohol solvent can not only avoid the dissolution of the substrate material due to the solvent orthogonality, but also ensure that the oxide nanoparticle ink can fully wet the substrate. However, at present, the $SnO_2$ nanoparticles cannot be stably dispersed in an alcohol solvent. Therefore, it is very important to find a method that allows $SnO_2$ nanoparticles to be dispersed stably in an alcohol solvent to expand the application scope of $SnO_2$ nanoparticles.

Light-emitting diode (LED) is a current-driven active light-emitting device. At present, LEDs that can be prepared in a large area by a solution method mainly include quantum dot light-emitting diodes (QLED) and organic light-emitting diodes (OLED), both of which have similar device structures, including thin films of cathode, electron-transporting layer (ETL), light-emitting layer (EML), hole-transporting layer (HTL) and anode deposited in sequence. The QLEDs and OLEDs prepared by the solution method have not been industrialized. For QLEDs, the main problems hindering industrialization include: (1) The efficiency and operational lifetime of blue QLEDs are still lower than those of red and green QLEDs which have reached the industrialization requirements. (2) At present, the QLED devices will not reach their optimum luminance efficiency and operational lifetime immediately after being produced, but be gradually improved in performance with the extension of storage time (1 week to several months), which is usually called "positive aging" in the industry. This process seriously hinders the industrial application of QLEDs. It is very important to study the mechanism of and how to eliminate positive aging in QLED devices. At present, the studies on the mechanism of positive aging all reveal that the positive aging may be attributed to zinc oxide (ZnO), an electron-transporting layer material widely used in QLED. ZnO is a high-carrier-mobility material with a band gap of 3.5 eV, which can be well used to inject electrons into QLED devices. However, ZnO is an amphoteric oxide, and its nanoparticles have active surface chemical properties. For example, during the storage of QLEDs, the surface oxygen adsorption sites of ZnO decrease irreversibly with the participation of proton $H^+$, which leads to the improvement of electron injection, and the occurrence of positive aging. To eliminate positive aging, the main approach is replacing ZnO with a more stable ETL material. By solving the dispersion problem of $SnO_2$ in an alcohol solvent and applying it to QLEDs, the positive aging problem can be solved without compromising the efficiency and service life of QLEDs, thus accelerating the industrialization process of QLED technology.

For OLEDs and photovoltaic devices based on perovskite and organic materials, organic molecular materials with shallow lowest unoccupied orbitals are widely used as electron-transporting layers. However, the penetration of water and oxygen will induce the organic material to form a deep-level defect in the band gap of the electron-transporting layer, causing the rapid degradation of the device performance. To isolate the water and oxygen and improve the stability of the device, a higher-cost packaging technology is needed. However, if the organic electron-transporting material is replaced by stable and dense inorganic tin oxide, it is expected to improve the stability of OLEDs and perovskite photovoltaics and reduce the preparation cost, thus promoting the industrial application.

SUMMARY OF THE INVENTION

To solve the above technical problems, the present invention provides a method for preparing tin oxide nanoparticles dispersed in an alcohol solvent, and use thereof.

A method for preparing tin oxide nanoparticles dispersed in an alcohol solvent comprises the following steps:

(1) dissolving tin chloride and a base in an ethanol solution, reacting with heating for 2-10 hrs at a constant temperature, subjecting the reaction product to solid-liquid separation, collecting the solid phase, and dissolving the solid phase in an alcohol solvent, to obtain a tin oxide-alcohol dispersion; and (2) adding a quaternary ammonium base to the tin oxide-alcohol dispersion obtained in Step (1), and reacting with stirring, to obtain the tin oxide nanoparticles.

In an embodiment of the present invention, in Step (1), the heating temperature is 100-200° C.

In an embodiment of the present invention, in Step (1), the ethanol solution has a volume concentration of 20-50%.

In an embodiment of the present invention, in Step (1), the base is sodium hydroxide, potassium hydroxide, lithium hydroxide, or magnesium hydroxide.

In an embodiment of the present invention, in Step (1), the alcohol solvent includes one or more of ethanol, methanol, and isopropanol.

In an embodiment of the present invention, in Step (1), the weight ratio of the tin chloride to the base is 701:264-701:500.

In an embodiment of the present invention, in Step (2), the quaternary ammonium base is selected from the group consisting of tetramethylammonium hydroxide, tetraethylammonium hydroxide, tetrapropylammonium hydroxide, and any combination thereof.

In an embodiment of the present invention, in Step (2), the weight-to-volume ratio of the quaternary ammonium base to the tin oxide-alcohol dispersion is greater than or equal to 5:1.

In an embodiment of the present invention, in Step (2), the stirring time is 1-5 hrs.

The present invention further provides tin oxide nanoparticles prepared by the method described above.

The present invention still further provides an optoelectronic device including the tin oxide nanoparticles.

In an embodiment of the present invention, the optoelectronic device includes QLED, OLED, or a perovskite photovoltaic device.

Compared with the prior art, the technical solution of the present invention has the following advantages:

The dispersion system of tin oxide nanoparticles in the prior art is mainly water and lacks alcohol systems, hindering the scope of application of tin oxide nanoparticles. In the present invention, a quaternary ammonium base is introduced to the surface of $SnO_2$ and used as a type of ligand. The significant steric effect brought by the ligand is utilized to solve the problem of dispersiveness of $SnO_2$ in an alcohol solvent and solve the problems of wettability in the production process of normal-structured QLED devices and strict selectivity of quantum dots for the precursor solvent of the charge-transporting layer. Also, the surface dipole brought by the ligand causes the conduction band of $SnO_2$ to shift upward, which results in a smaller electron injection barrier and greatly improves the efficiency and operational lifetime of QLED devices. As the cause of positive aging of QLEDs—ZnO is replaced by $SnO_2$, the overall stability of the device is greatly improved. Similarly, $SnO_2$ dispersed in the alcohol solvent can also be successfully applied to p-i-n type heterojunction devices such as OLEDs and perovskite photovoltaics, so as to solve the problem of preparing a dense $SnO_2$ thin films by spin coating on a substrate. The tin oxide nanoparticles of the present invention provide a new approach to the improvement of the stability of optoelectronic devices, and broaden the application scope of $SnO_2$, thus having important practical significance.

BRIEF DESCRIPTION OF THE DRAWINGS

To make the disclosure of the present invention more comprehensible, the present invention will be further described in detail by way of specific embodiments of the present invention with reference to the accompanying drawings, in which.

DETAILED DESCRIPTION OF THE PREFERRED EMBODIMENTS

The present invention will be further described below with reference to the accompanying drawings and specific examples so that those skilled in the art can better understand and implement the present invention; however, the present invention is not limited thereto.

Example 1

(1) Solvent-thermal synthesis of tin oxide nanoparticles: 701 mg of tin chloride pentahydrate ($SnCl_4 \cdot 5H_2O$) was accurately weighed using a balance and placed in a 50 mL Teflon reactor. 13 mL of anhydrous ethanol and 27 mL of deionized water were added and stirred to dissolve tin chloride. 264 mg of sodium hydroxide (NaOH) was accurately weighed, added to the completely dissolved tin chloride solution, and fully stirred for 10 min until it was dissolved. The Teflon reactor was transferred to a hydrothermal reactor, sealed, incubated for 6 hrs in an air-dry oven at 150° C., and then naturally cooled to room temperature. The reaction products were transferred to a centrifugal tube, and centrifuged at 8000 rpm for 10 min. The supernatant was discarded, and the precipitate was washed with deionized water and ultrasonically dispersed in 10 mL of ethanol, to obtain a poorly dispersed tin oxide-alcohol dispersion.

Figure 1:
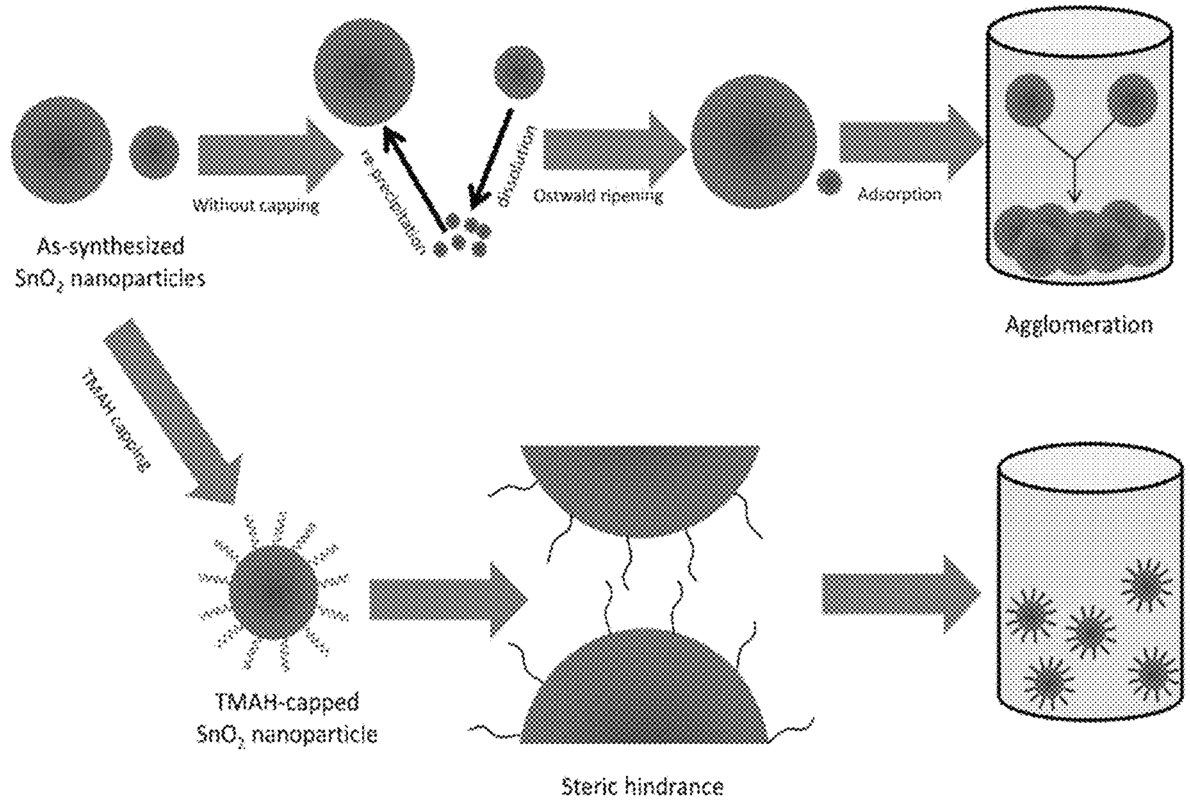
FIG. 1 schematically shows the dispersion of tin oxide nanoparticles in an alcohol solvent before and after coating.
Figure 2:
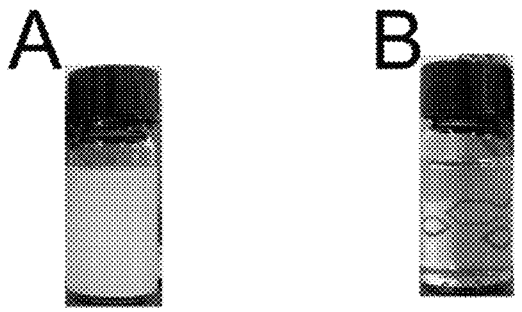
FIG. 2 shows tin oxide nanoparticles dispersed in an alcoholic solvent under natural light, before coating (A) and after coating (B).

(2) Coating of tin oxide nanoparticles: 5 mg of tetramethylammonium hydroxide (TMAH) was added per mL of the poorly dispersed tin oxide-alcohol dispersion, and the dispersion was vigorously stirred for 5 hrs. The dispersion changed from milky white to clear and transparent, to obtain a TMAH-coated tin oxide-alcohol dispersion, with a dispersiveness as shown in FIG. 2.

Example 2

(1) Solvent-thermal synthesis of tin oxide nanoparticles: 701 mg of tin chloride pentahydrate ($SnCl_4 \cdot 5H_2O$) was accurately weighed using a balance and placed in a 50 mL Teflon reactor. 10 mL of anhydrous ethanol and 40 mL of deionized water were added and stirred to dissolve tin chloride. 264 mg of potassium hydroxide (KOH) was accurately weighed, added to the completely dissolved tin chloride solution, and fully stirred for 10 min until it was dissolved. The Teflon reactor was transferred to a hydrothermal reactor, sealed, incubated for 10 hrs in an air-dry oven at 100° C., and then naturally cooled to room temperature. The reaction products were transferred to a centrifugal tube, and centrifuged at 8000 rpm for 10 min. The supernatant was discarded, and the precipitate was washed with deionized water and ultrasonically dispersed in 10 mL of isopropanol, to obtain a poorly dispersed tin oxide-alcohol dispersion.

(2) Coating of tin oxide nanoparticles: 25 mg of tetraethylammonium hydroxide (TEAH) was added per mL of the poorly dispersed tin oxide-alcohol dispersion, and the dispersion was vigorously stirred for 1 hr. The dispersion changed from milky white to clear and transparent, to obtain a TEAH-coated tin oxide-alcohol dispersion.

Example 3

(1) Solvent-thermal synthesis of tin oxide nanoparticles: 701 mg of tin chloride pentahydrate ($SnCl_4 \cdot 5H_2O$) was accurately weighed using a balance and placed in a 50 mL Teflon reactor. 13 mL of anhydrous ethanol and 27 mL of deionized water were added and stirred to dissolve tin chloride. 264 mg of magnesium hydroxide (MgOH) was accurately weighed, added to the completely dissolved tin chloride solution, and fully stirred for 10 min until it was dissolved. The Teflon reactor was transferred to a hydrothermal reactor, sealed, incubated for 4 hrs in an air-dry oven at 200° C., and then naturally cooled to room temperature. The reaction products were transferred to a centrifugal tube, and centrifuged at 8000 rpm for 10 min. The supernatant was discarded, and the precipitate was washed with deionized water and ultrasonically dispersed in 10 mL of methanol, to obtain a poorly dispersed tin oxide-alcohol dispersion.

(2) Coating of tin oxide nanoparticles: 50 mg of tetrapropylammonium hydroxide (TPAH) was added per mL of the poorly dispersed tin oxide-alcohol dispersion, and the dispersion was vigorously stirred for 5 hrs. The dispersion changed from milky white to clear and transparent, to obtain a TPAH-coated tin oxide-alcohol dispersion.

Example 4

(1) Solvent-thermal synthesis of tin oxide nanoparticles: 701 mg of tin chloride pentahydrate ($SnCl_4 \cdot 5H_2O$) was accurately weighed using a balance and placed in a 50 mL Teflon reactor. 13 mL of anhydrous ethanol and 27 mL of deionized water were added and stirred to dissolve tin chloride. 264 mg of lithium hydroxide (LiOH) was accurately weighed, added to the completely dissolved tin chloride solution, and fully stirred for 10 min until it was dissolved. The Teflon reactor was transferred to a hydrothermal reactor, sealed, incubated for 2 hrs in an air-dry oven at 150° C., and then naturally cooled to room temperature. The reaction products were transferred to a centrifugal tube, and centrifuged at 8000 rpm for 10 min. The supernatant was discarded, and the precipitate was washed with deionized water and ultrasonically dispersed in 10 mL of ethanol, to obtain a poorly dispersed tin oxide-alcohol dispersion.

(2) Coating of tin oxide nanoparticles: 5 mg of tetramethylammonium hydroxide (TMAH) was added per mL of the poorly dispersed tin oxide-alcohol dispersion, and the dispersion was vigorously stirred for 3 hrs. The dispersion changed from milky white to clear and transparent, to obtain a TMAH-coated tin oxide-alcohol dispersion.

Example 5

(1) Solvent-thermal synthesis of tin oxide nanoparticles: 701 mg of tin chloride pentahydrate ($SnCl_4 \cdot 5H_2O$) was accurately weighed using a balance and placed in a 50 mL Teflon reactor. 25 mL of anhydrous ethanol and 25 mL of deionized water were added and stirred to dissolve tin chloride. 500 mg of sodium hydroxide (NaOH) was accurately weighed, added to the completely dissolved tin chloride solution, and fully stirred for 10 min until it was dissolved. The Teflon reactor was transferred to a hydrothermal reactor, sealed, incubated for 6 hrs in an air-dry oven at 150° C., and then naturally cooled to room temperature. The reaction products were transferred to a centrifugal tube, and centrifuged at 8000 rpm for 10 min. The supernatant was discarded, and the precipitate was washed with deionized water and ultrasonically dispersed in 10 mL of ethanol, to obtain a poorly dispersed tin oxide-alcohol dispersion.

(2) Coating of tin oxide nanoparticles: 5 mg of tetramethylammonium hydroxide (TMAH) was added per mL of the poorly dispersed tin oxide-alcohol dispersion, and the dispersion was vigorously stirred for 5 hrs. The dispersion changed from milky white to clear and transparent, to obtain a TMAH-coated tin oxide-alcohol dispersion.

Example 6

(1) Solvent-thermal synthesis of tin oxide nanoparticles: 701 mg of tin chloride pentahydrate ($SnCl_4 \cdot 5H_2O$) was accurately weighed using a balance and placed in a 50 mL Teflon reactor. 16 mL of anhydrous ethanol and 24 mL of deionized water were added and stirred to dissolve tin chloride. 400 mg of sodium hydroxide (NaOH) was accurately weighed, added to the completely dissolved tin chloride solution, and fully stirred for 10 min until it was dissolved. The Teflon reactor was transferred to a hydrothermal reactor, sealed, incubated for 6 hrs in an air-dry oven at 150° C., and then naturally cooled to room temperature. The reaction products were transferred to a centrifugal tube, and centrifuged at 8000 rpm for 10 min. The supernatant was discarded, and the precipitate was washed with deionized water and ultrasonically dispersed in 10 mL of ethanol, to obtain a poorly dispersed tin oxide-alcohol dispersion.

(2) Coating of tin oxide nanoparticles: 5 mg of tetramethylammonium hydroxide (TMAH) was added per mL of the poorly dispersed tin oxide-alcohol dispersion, and the dispersion was vigorously stirred for 5 hrs. The dispersion changed from milky white to clear and transparent, to obtain a TMAH-coated tin oxide-alcohol dispersion.

Test Examples: Characterization of Nanoparticles

The tin oxide dispersion before and after coating in Example 1 was dried to obtain a nanoparticle powder, or the tin oxide dispersion before and after coating was spin-coated into a film. Then, the power or the film was tested by x-ray powder diffraction, Fourier infrared spectroscopy, transmission electron microscopy, dynamic light scattering, and ultraviolet photoelectron spectroscopy (UPS). The characterization results are shown in FIGS. 3-7.

Figure 3:
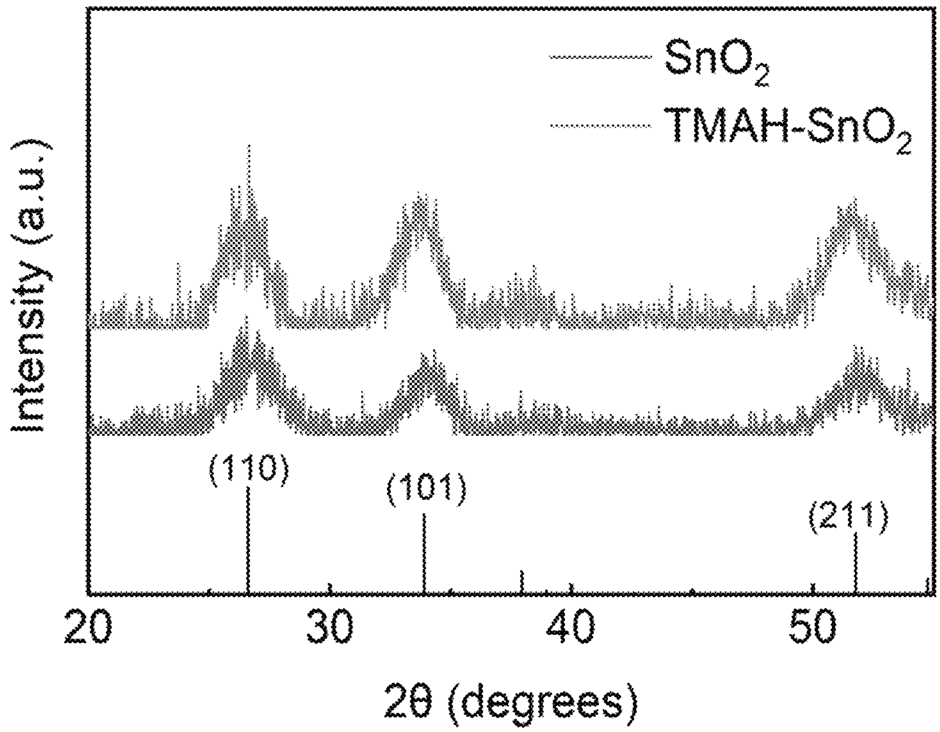
FIG. 3 shows X-ray diffraction patterns of tin oxide nanoparticles before and after coating.

FIG. 3 shows the X-ray diffraction peaks of tin oxide nanoparticles before and after coating, and the standard PDF card of tetragonal tin oxide, showing that the synthesized tin oxide particles conform to the tetragonal phase structure, and have a particle size of 3-4 nm as calculated by the Scherrer formula $$\left(D = \frac{\lambda}{\beta}\right).$$

Figure 4:
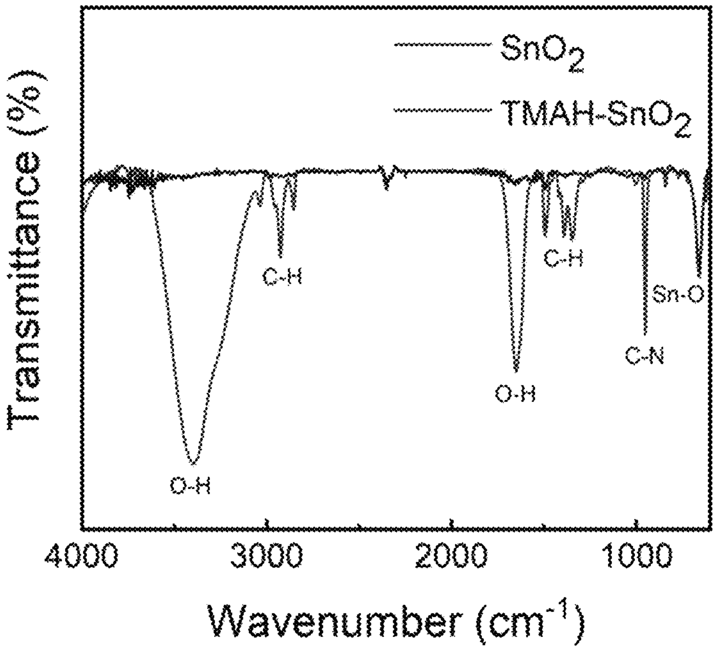
FIG. 4 shows a Fourier infrared spectrum of tin oxide nanoparticles.

FIG. 4 shows the Fourier infrared spectrum of tin oxide nanoparticles before and after coating. The results show that C—N and C—H bonds exist in the coated $SnO_2$ nanoparticles, and TMAH serves as a ligand and is successfully coated on the surface of nanoparticles.

Figure 5:
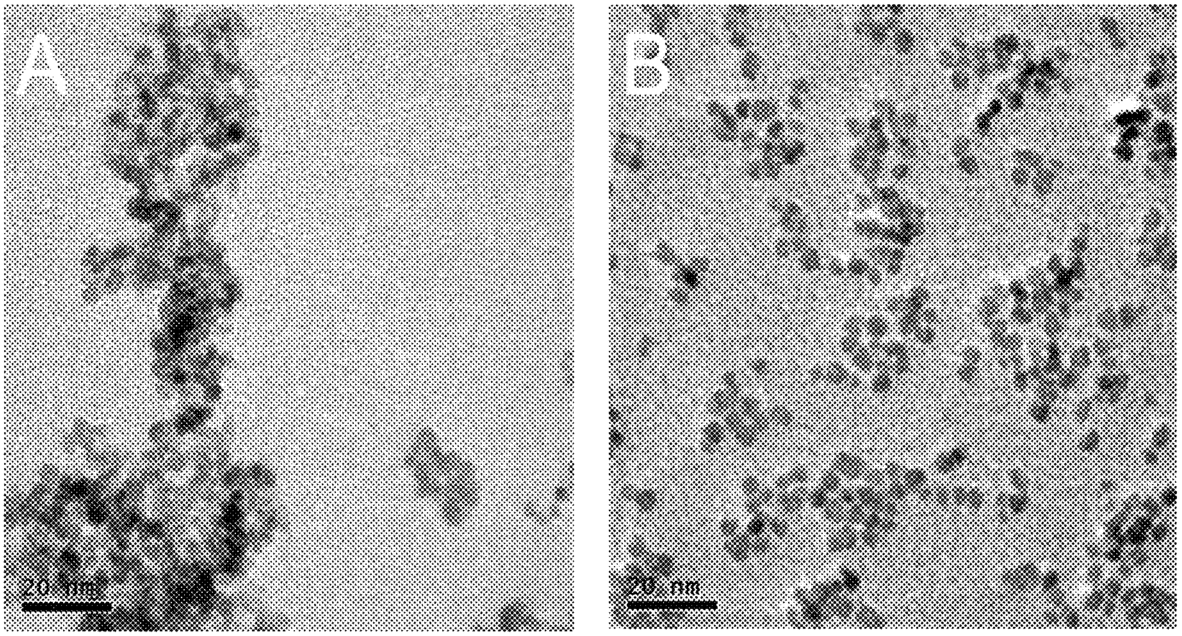
FIG. 5 shows transmission electron microscopy images of tin oxide nanoparticles that are uncoated (A) and coated with a quaternary ammonium base (B).

FIG. 5 shows the transmission electron microscopy images of tin oxide nanoparticles before and after coating. Before coating (FIG. 5A), the agglomeration of nanoparticles is obvious; and after coating (FIG. 5B), the dispersiveness of nanoparticles is improved, and the particle size is 3-4 nm, which is consistent with the XRD result.

Figure 6:
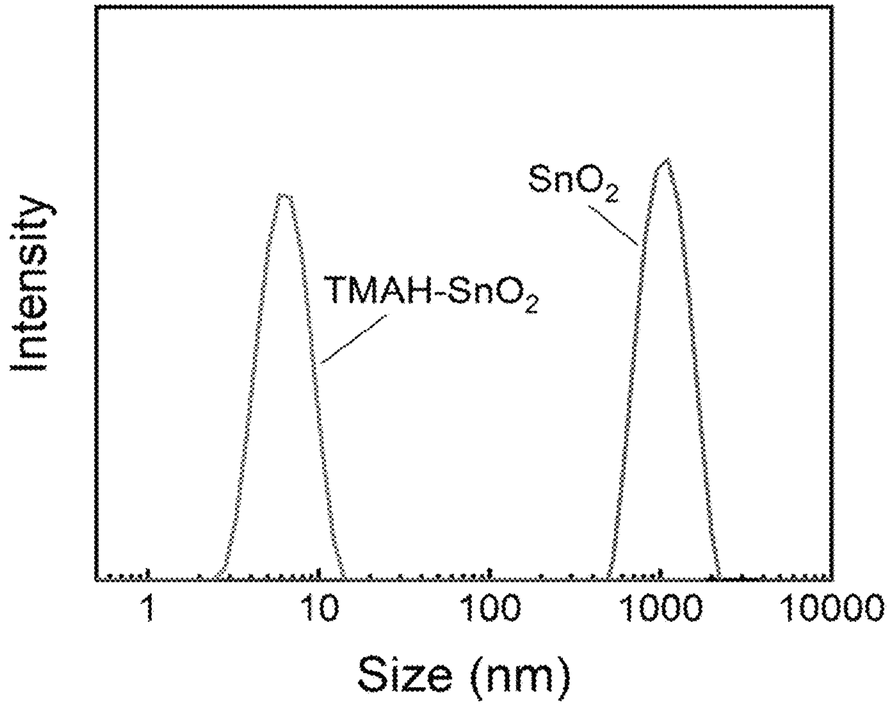
FIG. 6 shows the particle size, measured by dynamic light scattering, of tin oxide nanoparticles before and after coating.
Figure 7:
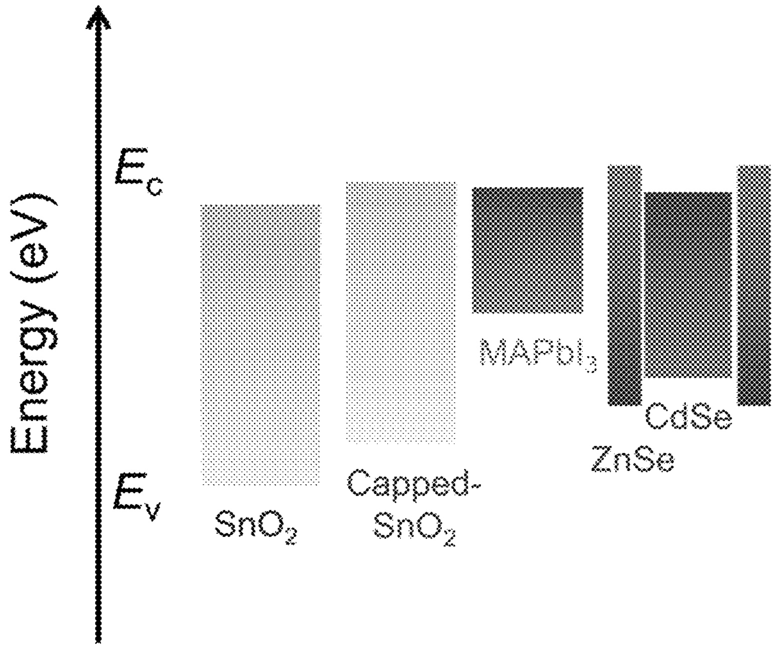
FIG. 7 shows the energy bands of tin oxide nanoparticles before and after coating, and $MAPbI_3$ and cadmium selenide quantum dots.

FIG. 6 shows the particle size, measured by dynamic light scattering, of tin oxide nanoparticles before and after coating. After coating, the dispersiveness of nanoparticles is obviously improved (FIG. 6).

Energy band diagram: To realize the application of tin oxide nanoparticles in p-i-n normal-structured QLED structures, the energy band position is very important for electron injection. In order to obtain the conduction band position of nanoparticles, in the present invention, the dispersion is spin-coated into a thin film, and characterized by UPS to obtain the work function and valence band, and the optical band gap was obtained by ultraviolet-visible absorption spectroscopy. With analysis combining the UPS and UV-Vis results, the energy levels of tin oxide nanoparticles before and after coating were obtained and summarized in FIG. 7. The energy band positions of $MAPbI_3$ and cadmium selenide quantum dots obtained from the literature are also shown. Due to the influence of the surface dipole of the ligand, the conduction band of the coated $SnO_2$ nanoparticles shifts upward, which is more beneficial to electron transport.

Application Examples (1) Tin Oxide-Based QLED Device

Due to the serious agglomeration and poor film formability of tin oxide before coating, the device and subsequent tin oxide-based QLED device both means quaternary ammonium base-coated tin oxide nanoparticles. The structure of the QLED device is indium tin oxide (ITO)/poly-3,4-ethylenedioxythiophene: polystyrene sulfonate (PEDOT:PSS)/poly-9,9-di-n-octylfluorenyl-2,7-diyl (TFB)/cadmium selenide quantum dots (QDs)/quaternary ammonium base-coated tin oxide nanoparticles (obtained in Example 1)/silver electrode. The ITO substrate was ultrasonically washed with glass detergent, deionized water, acetone, and isopropanol. The cleaned ITO was put into an ultraviolet ozone machine and treated for 15 min to improve the wettability. Then 40 nm PEDOT:PSS, 30 nm TFB, 80 nm QDs, and 40 nm $SnO_2$ films were successively deposited by spin-coating the precursor solutions, and finally, a 100 nm silver electrode was deposited through vacuum evaporation.

Figure 8:
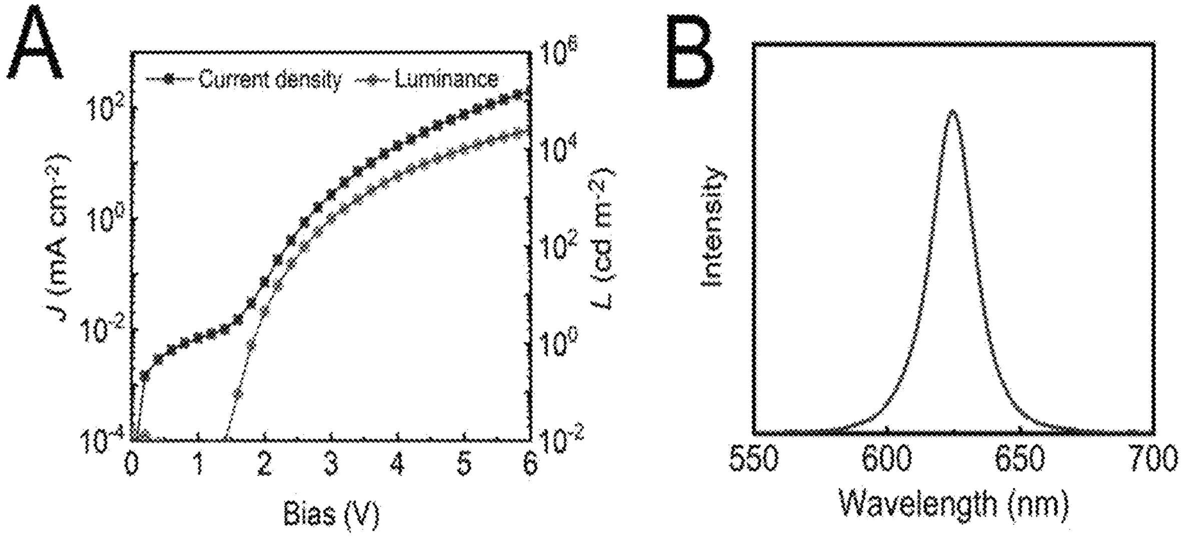
FIG. 8 shows a brightness-current-voltage curve and electroluminescence spectrum of a tin oxide-based quantum dot light emitting diode device obtained in Example (1), in which (A) is the brightness-current-voltage curve and (b) is the electroluminescence spectrum.
Figure 9:
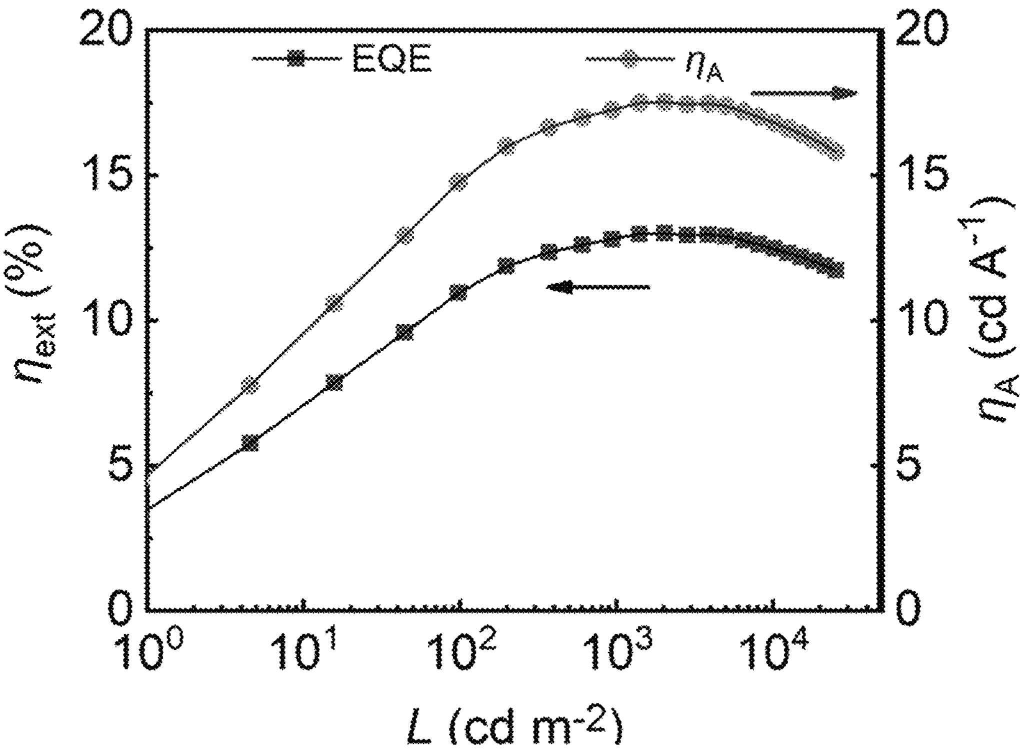
FIG. 9 shows an external quantum efficiency and a current efficiency curve of a tin oxide-based quantum dot light-emitting diode device obtained in Example (1).

(2) Performance of Tin Oxide-Based QLED Device:

Efficiency of QLED device: The prepared QLED device is fixed by a test fixture with a silica tube. The voltage was output by Keithley 2400 source meter and the current was recorded. The photoluminescence spectrum was recorded by Ocean Optics USB 2000 optical fiber spectrometer. The response current of the silica tube was recorded by Keithley 6485 picoammeter. The corresponding brightness and external quantum efficiency were calculated by the Labview program. The electroluminescent wavelength of the device is 625 nm (FIG. 8B), the turn-on voltage is 1.7V (A in FIG. 8), and the external quantum efficiency reaches 13.0% (FIG. 9), suggesting that the tin oxide-based QLED device is successfully prepared.

Figure 10:
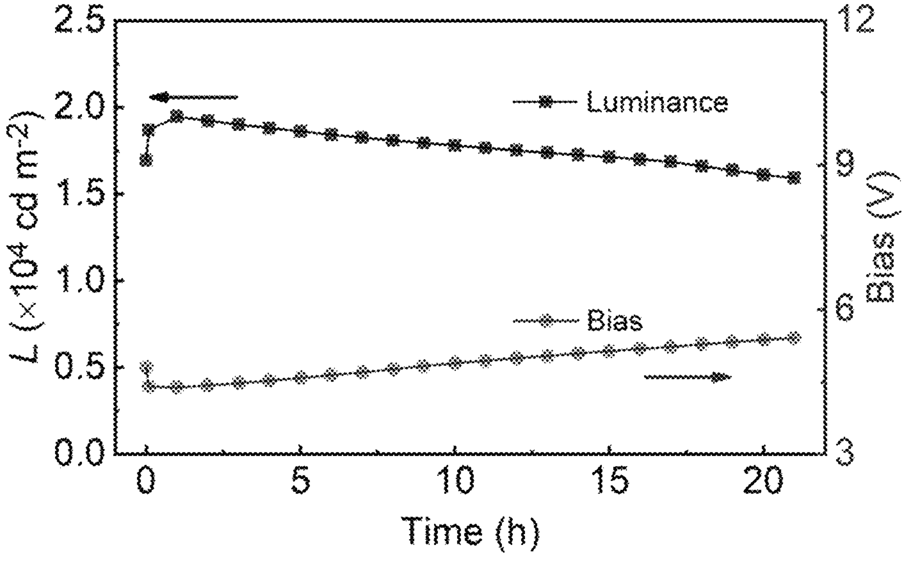
FIG. 10 shows an operational lifetime curve of a tin oxide-based quantum dot light-emitting diode device obtained in Example (1) when driven at a current of 4.5 mA.
Figure 11:
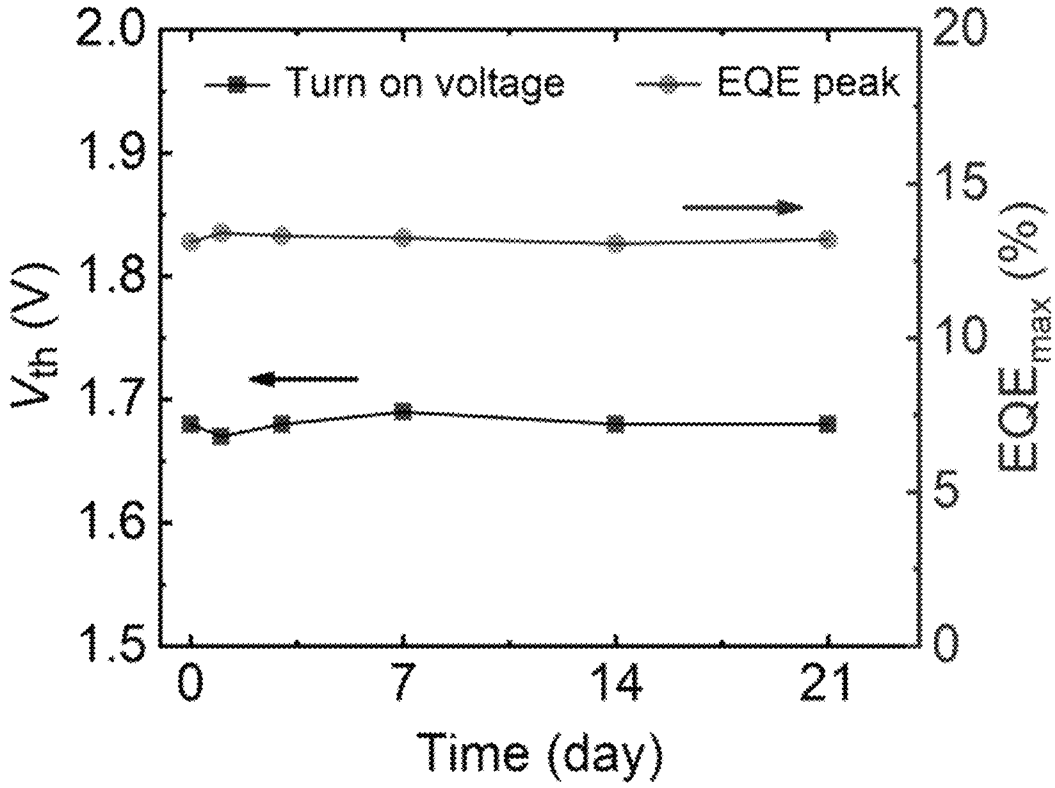
FIG. 11 shows the performance as a function of storage time of a tin oxide-based quantum dot light emitting diode device obtained in Example (1).

Stability of QLED device: 1. Operational lifetime: QLED was driven with a current of 4.5 mA, and the change of brightness with time was recorded. When the brightness declines to 95% of the initial brightness $L_0$, the process was terminated. The $LT_{95}$ time was measured repeatedly at different brightness, and $LT_{95}$ at an initial brightness of 1000 nits was fitted according to the formula $L^n \cdot t$=constant. $LT_{95}$ of the device=3200 h (FIG. 10). 2. Storage stability: The changes in the external quantum efficiency and the turn-on voltage of QLED with storage time were tracked and recorded. The EQE peak value of the device is basically unchanged within one month of tracking and recording, and the turn-on voltage is stable (FIG. 11). The prepared tin oxide-based QLED device has excellent operational lifetime and unique storage stability, and the positive aging is successfully suppressed.

(3) Tin Oxide-Based Perovskite Photovoltaic Device

The structure of the device includes indium tin oxide (ITO)/quaternary ammonium base-coated tin oxide nanoparticles/organic-inorganic hybrid perovskite ($MAPbI_3$)/2,2',7,7'-tetrakis[N,N-bis(4-methoxyphenyl)amino]-9,9'-spirobifluorene (Spiro-OMeTAD) (obtained in Example 1)/gold electrode. The ITO substrate was ultrasonically washed with glass detergent, deionized water, acetone, and isopropanol. The cleaned ITO was put into an ultraviolet ozone machine and treated for 15 min to improve the wettability. The $SnO_2$, $MAPbI_3$, and Spiro-OMeTAD films were successively deposited by spin coating the precursor solutions, and finally, an 80 nm gold electrode was deposited through vacuum evaporation.

(4) Tin Oxide-Based OLED Device

The structure of the device includes indium tin oxide (ITO)/HAT-CN/NPB/mCP/homoleptic tricyclometalated iridium (III) complexes with N-heterocyclic carbon (NHC) ligand: 3,3'-dicarbazolyl-5-cyanobiphenyl/quaternary ammonium base-coated tin oxide nanoparticles (obtained in Example 1)/Liq/aluminum electrode. The ITO substrate was ultrasonically washed with glass detergent, deionized water, acetone, and isopropanol. The cleaned ITO was put into an ultraviolet ozone machine and treated for 15 min to improve the wettability. HAT-CN, NPB, mCP, homoleptic tricyclometalated iridium (III) complexes with N-heterocyclic carbon (NHC) ligand: 3,3'-dicarbazolyl-5-cyanobiphenyl, $SnO_2$, and Liq were deposited successively, and finally, 100 nm aluminum electrode was deposited through vacuum evaporation.

Apparently, the above-described embodiments are merely examples provided for clarity of description, and are not intended to limit the implementations of the present invention. Other variations or changes can be made by those skilled in the art based on the above description. The embodiments are not exhaustive herein. Obvious variations or changes derived therefrom also fall within the protection scope of the present invention.

What is claimed is:

1. A method for preparing tin oxide nanoparticles dispersed in an alcohol solvent, comprising steps of:

(1) dissolving tin chloride and a base in an ethanol solution, reacting with heating for 2-10 hrs at a constant temperature, subjecting the reaction product to solid-liquid separation, collecting the solid phase, and dissolving the solid phase in an alcohol solvent, to obtain a tin oxide-alcohol dispersion; and (2) adding a quaternary ammonium base to the tin oxide-alcohol dispersion obtained in Step (1), and reacting with stirring, to obtain the tin oxide nanoparticles.

2. The method according to claim 1, wherein in Step (1), the heating temperature is 100-200° C.

3. The method according to claim 1, wherein in Step (1), the ethanol solution has a volume concentration of 20-50%.

4. The method according to claim 1, wherein in Step (1), the base is sodium hydroxide, potassium hydroxide, lithium hydroxide, or magnesium hydroxide.

5. The method according to claim 1, wherein in Step (1), the weight ratio of the tin chloride to the base is 701:264-701:500.

6. The method according to claim 1, wherein in Step (2), the weight-to-volume ratio of the quaternary ammonium base to the tin oxide-alcohol dispersion is greater than or equal to 5:1.

7. The method according to claim 1, wherein in Step (2), the quaternary ammonium base is selected from the group consisting of tetramethylammonium hydroxide, tetraethylammonium hydroxide, tetrapropylammonium hydroxide and any combination thereof.

8. Tin oxide nanoparticles prepared by the method according to claim 1.

9. A optoelectronic device, comprising the tin oxide nanoparticles according to claim 8.

10. The optoelectronic device according to claim 9, wherein the optoelectronic device comprises QLED, OLED, or a perovskite photovoltaic device.

* * * * *